US009852326B2

(12) United States Patent
Li et al.

(10) Patent No.: US 9,852,326 B2
(45) Date of Patent: *Dec. 26, 2017

(54) FACIAL EXPRESSION CAPTURE FOR CHARACTER ANIMATION

(71) Applicant: Adobe Systems Incorporated, San Jose, CA (US)

(72) Inventors: Wilmot Wei-Mau Li, Seattle, WA (US); Jianchao Yang, San Jose, CA (US); Linjie Luo, San Jose, CA (US); Jonathan W. Brandt, Santa Cruz, CA (US); Xiang Yu, Piscataway, NJ (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/398,881

(22) Filed: Jan. 5, 2017

(65) Prior Publication Data
US 2017/0116467 A1 Apr. 27, 2017

Related U.S. Application Data

(63) Continuation of application No. 14/661,788, filed on Mar. 18, 2015, now Pat. No. 9,552,510.

(51) Int. Cl.
G06K 9/62 (2006.01)
G06K 9/68 (2006.01)
(Continued)

(52) U.S. Cl.
CPC ..... *G06K 9/00288* (2013.01); *G06K 9/00228* (2013.01); *G06K 9/00302* (2013.01);
(Continued)

(58) Field of Classification Search
None
See application file for complete search history.

(56) References Cited

U.S. PATENT DOCUMENTS 9,384,385 B2 7/2016 Park et al.
9,400,918 B2 * 7/2016 Yin ................... G06K 9/00221
(Continued)

OTHER PUBLICATIONS

"Challenges in Representation Learning: Facial Expression Recognition Challenge", http://www.kaggle.com/c/challenges-in-representation-learning-facial-expression-recognition-challenge, Apr. 2013, 2 pages.
(Continued)

*Primary Examiner* — Soo Park
(74) *Attorney, Agent, or Firm* — Wolfe-SBMC

(57) ABSTRACT

Techniques for facial expression capture for character animation are described. In one or more implementations, facial key points are identified in a series of images. Each image, in the series of images, is normalized from the identified facial key points. Facial features are determined from each of the normalized images. Then a facial expression is classified, based on the determined facial features, for each of the normalized images. In additional implementations, a series of images are captured that include performances of one or more facial expressions. The facial expressions in each image of the series of images are classified by a facial expression classifier. Then the facial expression classifications are used by a character animator system to produce a series of animated images of an animated character that include animated facial expressions that are associated with the facial expression classification of the corresponding image in the series of images.

20 Claims, 11 Drawing Sheets

(51) Int. Cl.
  G06K 9/00     (2006.01)
  G06T 13/40    (2011.01)
  G06K 9/46     (2006.01)
  G06K 9/66     (2006.01)
  G06T 7/246    (2017.01)

(52) U.S. Cl.
  CPC ......... *G06K 9/4604* (2013.01); *G06K 9/4642* (2013.01); *G06K 9/66* (2013.01); *G06T 7/246* (2017.01); *G06T 13/40* (2013.01)

(56) References Cited

U.S. PATENT DOCUMENTS

| | | | |
|---|---|---|---|
| 9,400,919 B2 * | 7/2016 | Yin | G06K 9/00221 |
| 9,552,510 B2 | 1/2017 | Li et al. | |
| 2010/0296706 A1 | 11/2010 | Kaneda et al. | |
| 2012/0139830 A1 | 6/2012 | Hwang et al. | |
| 2012/0213302 A1 | 8/2012 | Walton et al. | |
| 2016/0098844 A1 | 4/2016 | Shaji et al. | |
| 2016/0275341 A1 | 9/2016 | Li et al. | |

OTHER PUBLICATIONS

"Notice of Allowance", U.S. Appl. No. 14/661,788, Sep. 12, 2016, 8 pages.
"Pre-Interview Communication", U.S. Appl. No. 14/661,788, Jul. 26, 2016, 4 pages.
Chew,"Improved Facial Expression Recognition via Uni-Hyperplane Classification", Robotics Institute, 2012, 8 pages.
Dalal,"Histograms of Oriented Gradients for Human Detection", Conference on Computer Vision and Pattern Recognition, 2005, Jun. 2005, 8 pages.
Dibeklioglu,"Like Father, Like Son: Facial Expression Dynamics for Kinship Verification", Conference on Computer Vision (ICCV), 2013 IEEE International, 2013, pp. 1497-1504
Essa,"Coding, Analysis, Interpretation, and Recognition of Facial Expressions", IEEE Trans. Pattern Analysis and Machine Intelligence, 1997, 9 pages.
Huyen,"Gradient-based Local Descriptor and Centroid Neural Network for Face Recognition", ISNN 2010, Part II, LNCS 6064, 2010, 8 pages.
Ijjina,"Facial expression recognition using kinect depth sensor and convolutional neural networks", ICMLA 2014, 2014, 5 pages.
Jung,"Deep Temporal Appearance-Geometry Network for Facial Expression Recognition", Published on arxiv.org, Mar. 5, 2015, 9 pages.
Kanade,"Comprehensive Database for Facial Expression Analysis", IEEE 4th Int. Conf. Automatic Face and Gesture Recognition, 2000, 8 pages.
Lucey,"The Extended Cohn-Kanade Dataset (CK+): A complete dataset for action unit and emotion-specified expression", International workshop on CVPR for Human Communicative Behavior Analysis, 2010, 8 pages.
Pantic,"Web-Based Database for Facial Expression Analysis", EEMCS/Man-Machine Interaction Group, 2005, 5 pages.
Rudovic,"Multi-output Laplacian Dynamic Ordinal Regression for Facial Expression Recognition and Intensity Estimation", Proc. IEEE Conf. Computer Vision and Pattern Recognition (CVPR), 2012, 8 pages.
Saxena,"Robust facial expression recognition using a state-based model of spatiallylocalised facial dynamics", International Conference on Systemics, Cybernetics and Informatics, Feb. 12-15, 2004, Feb. 2004, pp. 124-129.
Sebe,"Emotion Recognition Based on Joint Visual and Audio Cues", ICPR 2006, 2006, 4 pages.
Sun,"Deep Convolutional Network Cascade for Facial Point Detection", In Proceedings of IEEE Conference on Computer Vision and Pattern Recognition (CVPR), 2013., Jun. 2013, pp. 3476-3483.
Valstar,"The First Facial Expression Recognition and Analysis Challenge", Proceedings of IEEE International Conference on Automatic Face and Gesture Recognition, 2011, 6 pages.
Zhong,"Learning Active Facial Patches for Expression Analysis", Computer Vision and Pattern Recognition (CVPR), 2012 IEEE Conference on Biometrics Compendium, IEEE, 2012, 8 pages.

* cited by examiner

FACIAL EXPRESSION CAPTURE FOR CHARACTER ANIMATION

RELATED APPLICATIONS

This application is a continuation of and claims priority to U.S. patent application Ser. No. 14/661,788 entitled "Facial Expression Capture for Character Animation" and filed Mar. 18, 2015, the disclosure of which is hereby incorporated by reference herein in its entirety.

BACKGROUND

Animating virtual characters has become a critical task in the production of movies, television shows, computer games, and many other types of digital media. Performance-driven character animation enables users to create expressive results by performing the desired motion of the character with their face and/or body. In most performance driven systems, the continuous motion of the user is directly transferred to the virtual character. While this approach is suitable for some animation scenarios, continuous motion alone is not sufficient for all styles of animation. In particular, cutout character animation combines continuous transformation of visual elements with discrete replacements of artwork. Most existing systems do not support performance-based triggering of artwork replacements, and cannot directly support the creation of cutout character animations.

SUMMARY

Techniques for facial expression capture for character animation are described. In one or more implementations, facial key points are identified in a series of images. Each image, in the series of images is normalized, from identified facial key points. Facial features are determined from each of the normalized images. Then a facial expression is classified for each of the normalized images based on the determined facial features.

In an example implementation, an image capture device captures a series of images that includes performances of one or more facial expressions of a user. The facial expressions of the user, in each image of the series of images, are classified by a facial expression classifier. Then the facial expression classifications are used by a character animator system to produce a series of animated images of an animated character that includes animated facial expressions that are associated with the facial expression classification of the corresponding image in the series of images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
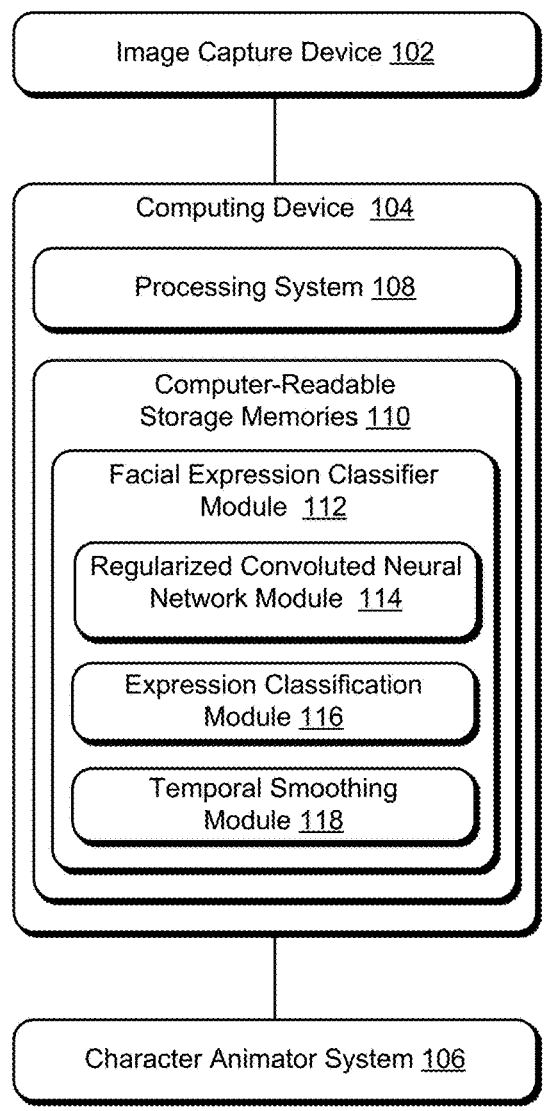
FIG. 1 is an illustration of an environment in an example implementation that is operable to employ techniques for facial expression capture for character animation.

Traditional character animation typically involves key-framing of animation parameters that define how a character moves. While keyframe-based animation gives the user fine-grained control of the animation, it requires a large amount of time, effort, and skill to produce high quality results. More recently, advances in motion capture technology have enabled performance-driven workflows where users control characters by acting out the desired motions with their faces and/or bodies. These performance-driven workflows allow users to quickly create expressive character animations without having to explicitly define how each individual animation parameter changes over time.

In most performance-driven systems, the continuous motion of the user is directly transferred to the virtual character. While this approach is suitable in some animation scenarios (e.g., creating realistic motion for virtual characters in live action movies), continuous motion alone is not sufficient for all styles of animation. In particular, cutout character animation is a popular style of animation that combines continuous transformations of visual elements with discrete replacements of artwork. These replacements allow animators to drastically alter the appearance of certain visuals and are often used to change the expression of a character. Facial animation is a critical component of cutout character animation scenarios. To support performance-based triggering of artwork replacements, a facial expression capture system needs to address a number of challenges, specifically recognizing a wide range of facial expressions, minimizing training for the recognition of specific expressions, and performing the facial expression recognition in real time to provide feedback of the results to the user.

Expressive cutout animation characters exhibit many different facial expressions that help define a unique personality of the character. The facial expression capture system provides facial expression recognition to handle a wide range of facial expressions. Moreover, since animators often use different expressions for different characters, the facial expression capture system handles a customizable, rather than predefined, set of expressions.

One way to support customized expressions is for an actor to perform specific facial expressions to train the facial expression capture system to recognize the specific facial expressions. The facial expression capture system receives a short sequence of image frames of a facial expression performed by the actor. Using the short sequence of images, the facial expression capture system provides facial expression recognition for a wide range of facial expressions, while minimizing training for each facial expression.

Performance-driven animation enables actors to quickly experiment with different timings and motions by acting out a number of variations of a performance, and evaluating the resulting animations. The facial expression capture system recognizes facial expressions in real time, for example at the frame rate of a video system, so that the user receives immediate feedback on the results of their performance and the resulting animation.

Conventional facial recognition techniques are generally designed to recognize a limited set of canonical expressions, typically the six expressions: angry, disgusted, scared, happy, sad, and surprised. A performance-driven cutout character animation supports a much wider range of expressions than this canonical set in order to translate an actor's performance into a realistic animation character. In addition, non-canonical expressions often exhibit far more inter-person variations, even within a single expression category, than those in the set of canonical expressions. The facial expression capture system uses a Convoluted Neural Network (CNN), also referred to as deep CNN, to recognize the canonical facial expressions.

To recognize non-canonical facial expressions, the facial expression capture system uses customized techniques for feature extraction and classification, also referred to as handcrafted feature extraction. The customized feature extraction combines extracting geometric features and appearance features from a small number of video frames to recognize facial expressions. The geometric features describe spatial deformations of facial landmarks and appearance features capture the appearance of the most discriminative facial regions for facial expression recognition.

By combining the CNN with the customized feature extraction techniques, the facial expression capture system for character animation combines the speed of the CNN in recognizing canonical expressions with the flexibility and minimal training of the customized feature extraction techniques to provide real-time facial expression recognition of customized, non-canonical facial expressions for use in character animation.

Example Environment

FIG. 1 is an illustration of an environment 100 in an example implementation that is operable to employ techniques described herein. The illustrated environment 100 includes an image capture device 102, a computing device 104, and a character animator system 106. The image capture device 102 is communicatively coupled to the computing device 104 in any suitable manner, to provide one or more images to the computing device 104 for training or recognition and classification. For example, the image capture device 102 may be is connected to the computing device 104 over a wired interface, such as USB or Ethernet, or connected over a wireless interface, such as Wi-Fi or Bluetooth.

The computing device 104 is communicatively coupled to the character animator system 106, in any suitable manner, to provide classified facial expressions to the character animator system 106 to create a character animation. For example, the computing device 104 may be is connected to the character animator system 106 over a wired interface, such as USB or Ethernet, or connected over a wireless interface, such as Wi-Fi or Bluetooth.

The image capture device 102, the computing device 104, and the character animator system 106 may be implemented on multiple computing devices or any combination of the image capture device 102, the computing device 104, and the character animator system 106 may be implemented on a single computing device. The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider utilized by a business to perform operations "over the cloud" as further described in relation to FIG. 12.

The computing device 104 is shown as having a processing system 108 that may include one or more processing devices (e.g., processors) and one or more computer-readable storage memories 110. The illustrated environment 100 also includes a facial expression classifier module 112 that includes a regularized convoluted neural network module 114 (r-CNN), an expression classification module 116, and a temporal smoothing module 118, embodied on the computer-readable storage memory 110 and operable via the processing system 108 to implement corresponding functionality described herein. In at least some embodiments, the computing device 104 may include functionality to access web-based resources (e.g., content and services), browse the Internet, interact with online providers, and so forth as described in further detail below.

Example Implementation

The following discussion describes example implementations of facial expression capture for character animation that can be employed to perform various aspects of techniques discussed herein. The example implementations may be employed in the environment 100 of FIG. 1, the system 1200 of FIG. 12, and/or any other suitable environment.

Figure 2:
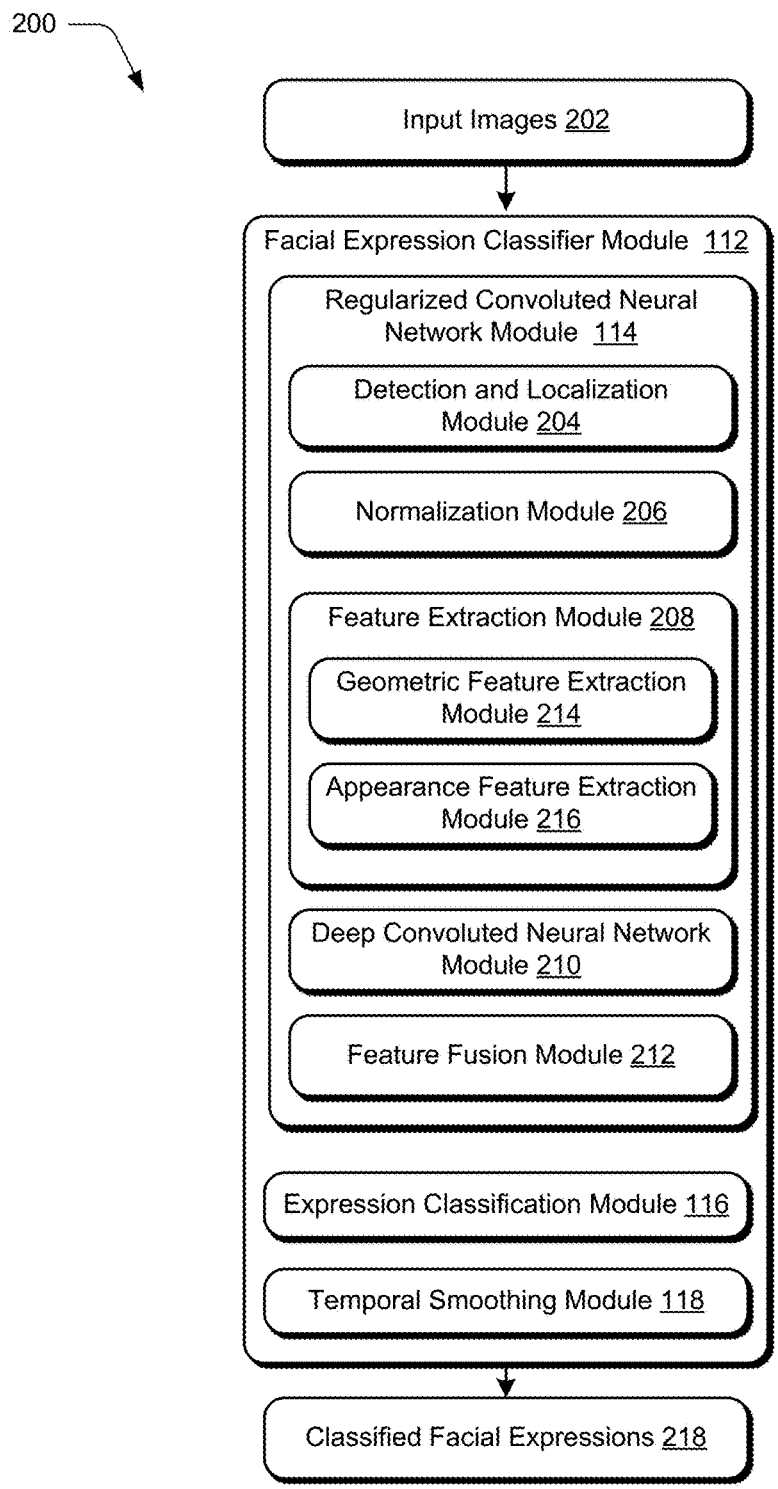
FIG. 2 is an illustration of an example implementation that is operable to employ techniques for facial expression capture for character animation.

FIG. 2 is an illustration of an example implementation 200 that is operable to employ techniques for facial expression capture for character animation. Frames of video of an actor's performance, including facial expressions, are captured and provided as input images 202 to the facial expression classifier module 112. For example, the image capture device 102 captures the input images 202 as a video including a number of frames that contain facial expressions of an actor's performance. By way of example, and not limitation, one to two seconds of the actor's performance is captured at 30 frames per second by the image capture device 102.

As noted above, the facial expression classifier module 112 includes the regularized convoluted neural network module (r-CNN) 114, the expression classification module 116, and the temporal smoothing module 118. In turn, the r-CNN module 114 includes a detection and localization module 204, a normalization module 206, a feature extraction module 208, a deep convolutional neural network module 210, and a feature fusion module 212.

Facial expressions in the input images 202 are extracted. Customized facial expressions (i.e. facial expressions that are not included in the canonical set of facial expressions) and canonical facial expressions are extracted from the input images 202. In implementations, the feature extraction module 208 is configured to extract customized facial expressions and the deep convoluted neural network module 210 is configured to extract canonical facial expressions from the input images 202.

Figure 3:
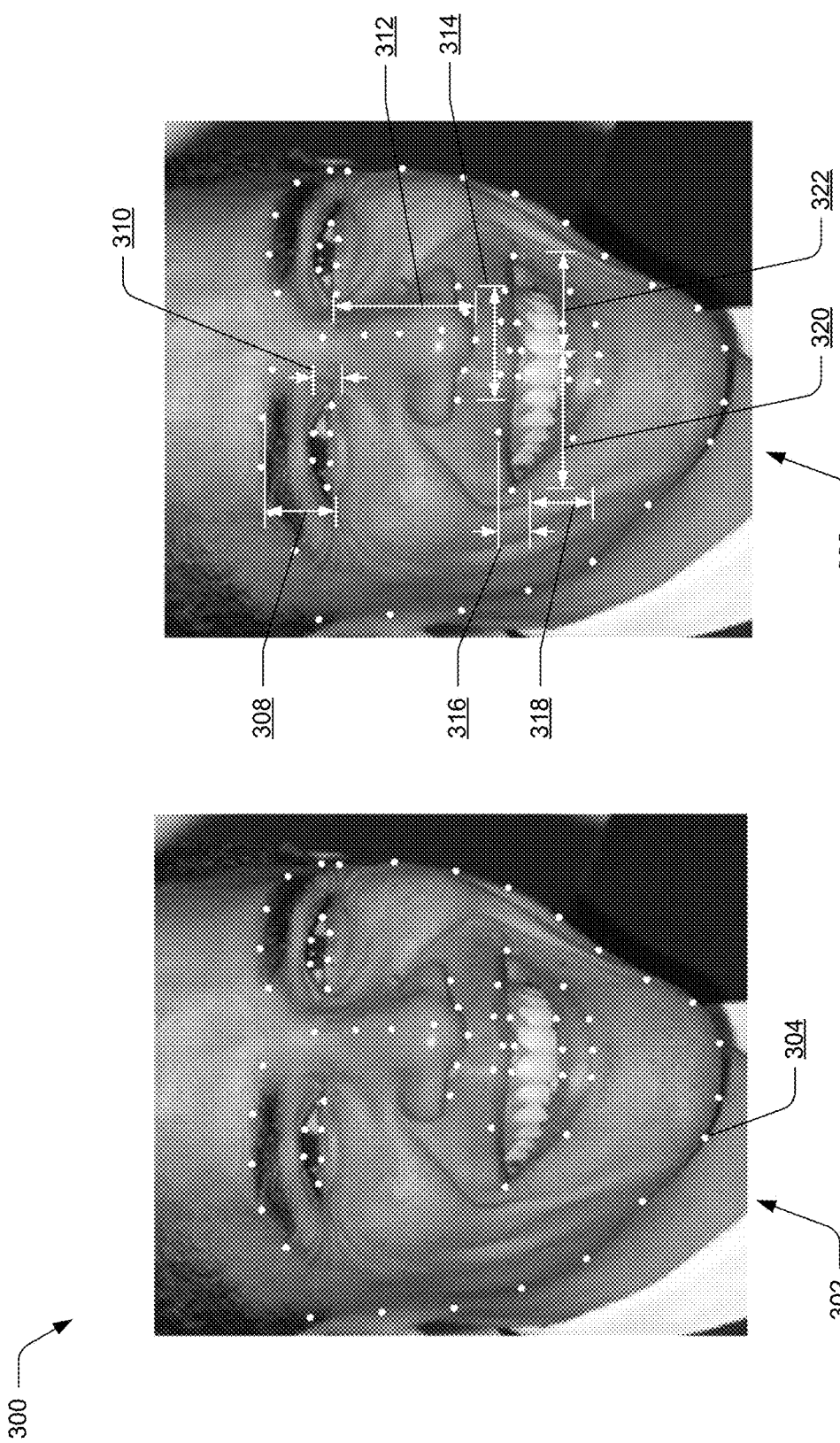
FIG. 3 is an illustration of an example of geometric feature extraction techniques for facial expression capture for character animation.

Facial key points are identified in the input images 202. In implementations, the detection and localization module 204 is configured to identify facial key points in the input images 202 and determine a location for the identified facial key points in the input images 202. For example, in image 302 of FIG. 3, facial key points 304 are identified, as illustrated by the white dots in the image 302. (For clarity of illustration, a single facial key point is labeled at 304 in the image 302.)

Facial feature measurements are normalized to be consistent between different images. In implementations, the normalization module 206 is configured to normalize each image in the input images 202, based on inter-ocular distance. The normalization module 206 transforms each image of the input images 202 into a frontal view using an affine deformation, and scales of each image based on the inter-ocular distance. For example, for each image, I, and the associated facial key points 304, S, of each image, the normalization module 206 scales each image to a selected normalized inter-ocular distance, $\bar{d}$. The normalization module 206 uses the facial key points 304 to calculate, a left eye center, CL, a right eye center, CR, and an in-plane rotation, $\phi$. If the in-plane rotation is negative, ($|\phi| \leq \phi$), then:

$$I=R(I), S=R(S), R=[\cos \phi, \sin \phi; -\sin \phi, \cos \phi] \quad (1)$$

The inter-ocular distance, d, is calculated as:

$$d=|CL-CR| \quad (2)$$

The image, I, and the facial key points, S, are then normalized by:

$$I=\text{resize}(I, \bar{d}/d) \quad (3)$$

$$S=S(\bar{d}/d) \quad (4)$$

Geometric and appearance features are determined in the input images 202. The feature extraction module 208 is illustrated as including a geometric feature extraction module 214 and an appearance feature extraction module 216. In implementations, the geometric feature extraction module 214 is configured to identify geometric features, which describe the spatial deformations of facial landmarks. To capture deformations caused by the activation of facial muscles, geometric features are defined that capture the two-dimensional configuration of the facial landmarks.

Since facial expressions are mainly controlled by muscles around the mouth, eyes, and eyebrows, facial features are determined based on the shape and location of these parts of the face for facial feature extraction. By way of example, and not limitation, these facial features are defined by the following measurements and illustrated at 306 in FIG. 3: the left/right eyebrow height 308 (vertical distance between top of the eyebrow and center of the eye), left/right eyelid height 310 (vertical distance between top of an eye and bottom of the eye), nose height 312 (vertical distance between bottom of the nose and center of both eyes), nose width 314 (horizontal distance between leftmost and rightmost nose landmarks), upper lip height 316 (vertical distance between top and center of the mouth), lower lip height 318 (vertical distance between bottom and center of the mouth), left mouth corner to mouth center distance 320, and right mouth corner to mouth center distance 322.

The set of the extracted facial features produced by the geometric feature extraction module 214 is defined as:

$$f_{geo}=[d_{left\text{-}eyebrow\text{-}height}, d_{right\text{-}eyebrow\text{-}height},$$
$$d_{left\text{-}eyelid\text{-}height}, d_{right\text{-}eyelid\text{-}height}, d_{nose\text{-}height},$$
$$d_{upper\text{-}lip\text{-}height}, d_{lower\text{-}lip\text{-}height},$$
$$d_{left\text{-}mouth\text{-}corner\text{-}width}, d_{right\text{-}mouth\text{-}corner\text{-}width}] \quad (5)$$

In implementations, the appearance feature extraction module 216 is configured to identify appearance features, which capture the appearance of the discriminative facial regions for expression recognition. While geometric features capture spatial deformations of facial landmarks, the geometric features do not consider the appearance changes caused by such deformations.

Figure 4:
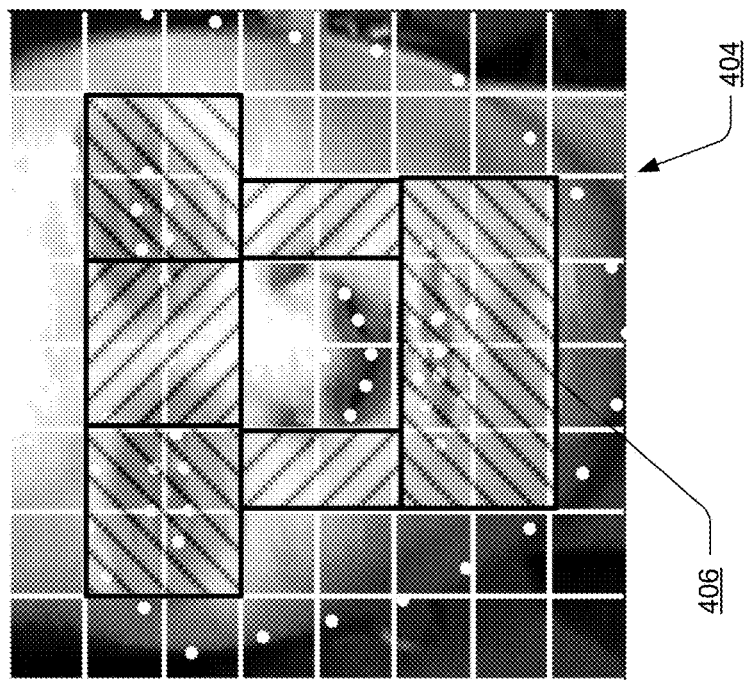
FIG. 4 is an illustration of an example of appearance feature extraction techniques for facial expression capture for character animation.
Figure 4:
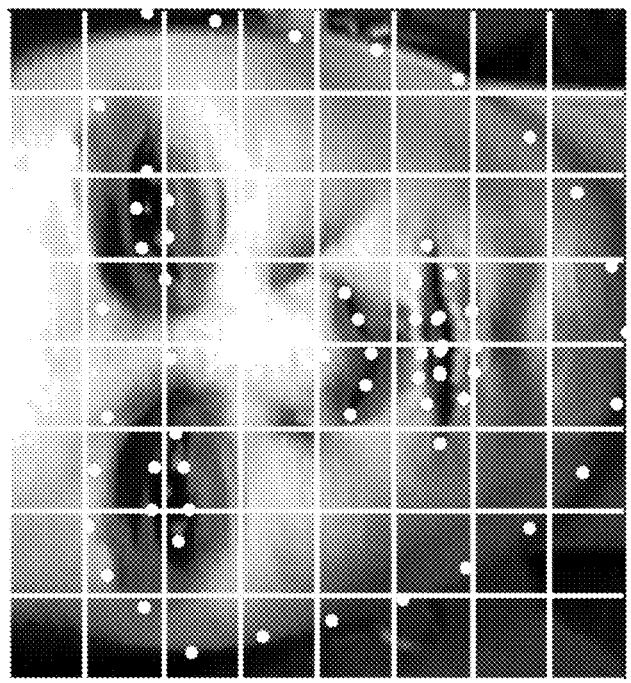

For example, the appearance feature extraction module 216 partitions the face image into a uniform grid of 8 by 8 image patches, as illustrated at 402 in FIG. 4. The appearance feature extraction module 216, evaluates all 2 by 1, 2 by 2, and 1 by 2 regions of the image patches in the image, including overlapping regions. Image 404 illustrates example image patches, such as at 406. Alternatively, fixed regions of the facial area, determined from the facial key points, may be used in addition to, or in instead of, the image patches from the uniform grid of 8 by 8 image patches to extract the appearance features.

The appearance feature extraction module 216 computes Histogram of Gradient (HoG) features on each of the regions and concatenates the HoG features into an integrated feature vector. If only a subset of the concatenated HoG features is meaningful for distinguishing between different expressions, the subset with the best features to include is selected by training the appearance feature extraction module 216.

In implementations, the appearance feature extraction module 216 is configured to select the subset of features based on training the appearance feature extraction module 216. For example, each of a set of face images for training is labeled with one of multiple expression categories, t. For each expression category, t, the appearance feature extraction module 216 creates a set of tuples $(x_i^t, y_i^t)$ where $x_i^t \in \mathbb{R}^M$ is the integrated feature vector for the i-th image and $y_i^t \in \{-1, 1\}$ indicates whether the image is a positive ($y_i^t = 1$) or negative ($y_i^t = -1$) example of category t. For each category t, the appearance feature extraction module 216 defines a weight vector, $w^t$, that represents a separating hyperplane, such that $y=(w^t)^T x_i^t + b^t$ is a classification prediction for $x_i^t$.

The appearance feature extraction module 216 defines an overall weight matrix $W \in \mathbb{R}^{T \times M}$ for all expression categories by setting its t-th row $W(t,:) = (w^t)^T$. The appearance feature extraction module 216 decomposes the matrix into a concatenation of submatrices $W=[w_{C_1}, \ldots, w_{C_K}]$, where $w_{C_j}$ corresponds to the weights for the j-th block across all T expression categories and $C_j$ indicates the image patches that belong to j-th block.

The appearance feature extraction module 216 minimizes the classification error over all the expression categories while requiring that W satisfies a structured group sparsity property. For example, the appearance feature extraction module 216 is configured to formulate this problem as a multi-task sparse learning problem, where recognizing each of the T independent expression categories represents the individual tasks. Specifically, the multi-task sparse learning problem is defined as:

$$W \in \mathbb{R}^{T \times M} \overset{argmin}{\sum_{t=1}^{T}} \frac{1}{n} \sum_{i=1}^{n} L(W, X^t, Y^t) + \lambda R(W) \quad (6)$$

where n is the number of training face images, $X^t$ is a matrix with $\{x_i^t\}$ as columns, and $Y^t$ is a concatenated label vector for all examples for category t. $L(W,X^t,Y^t)$ is a loss evaluation over expression t classification, R(W) is a regularization term selecting the block-wise image patches, and $\lambda$ is a weighting term for the regularization term, R (W).

The loss evaluation function, $L(W,X^t,Y^t)$, is a logistic:

$$L(W,X^t,Y^t)=\log(1+\exp(-Y^t \odot (WX^t))) \quad (7)$$

where $\odot$ refers to an element-wise product. For regularization, the appearance feature extraction module 216 uses $l_{1,2}$ to enforce group sparsity and selects facial components for the classification by optimizing Equation 8 by thresholding $\|\omega_{C_j}\|_2$, in:

$$R(W) \sum_{j=1}^{K} \|\omega_{c_j}\|_2 \quad (8)$$

Once the facial regions are selected, the appearance feature extraction module 216 extracts Local Binary Patterns (LBP) and/or HoG features from each region. The appearance feature extraction module 216 concatenates the extracted LBP and/or HoG features to obtain the final appearance features. The feature extraction module 208 provides the final appearance features to the feature fusion module 212, which is described in detail below. Alternatively, the final appearance features may be provided directly to the expression classifier module 116 for classification without using the feature fusion module 212.

Canonical facial expressions are extracted from the input images 202. In implementations, the deep convoluted neural network module 210 is configured for facial expression recognition using multiple convolutional layers and max-pooling layers, followed by several fully connected layers. As known in the art, deep convoluted neural networks learn to accurately identify the canonical facial expressions, when trained with thousands of images of the canonical facial expressions from publically available sets of images of the canonical facial expressions.

The convolutional layers comprise a rectangular grid of neurons. Each neuron in the convolutional layer takes inputs from n input image or a region of the previous layer, convolves the region using specified weights for a convolutional filter. The max-pooling layers subsample each region received from a convolutional layer to produce a single output for each region, which is the maximum of the region being pooled. The fully connected layers take all the neurons in a previous layer, regardless of the type of layer, and connect each neuron in the previous layer to every neuron in the fully connected layer.

Figure 5:
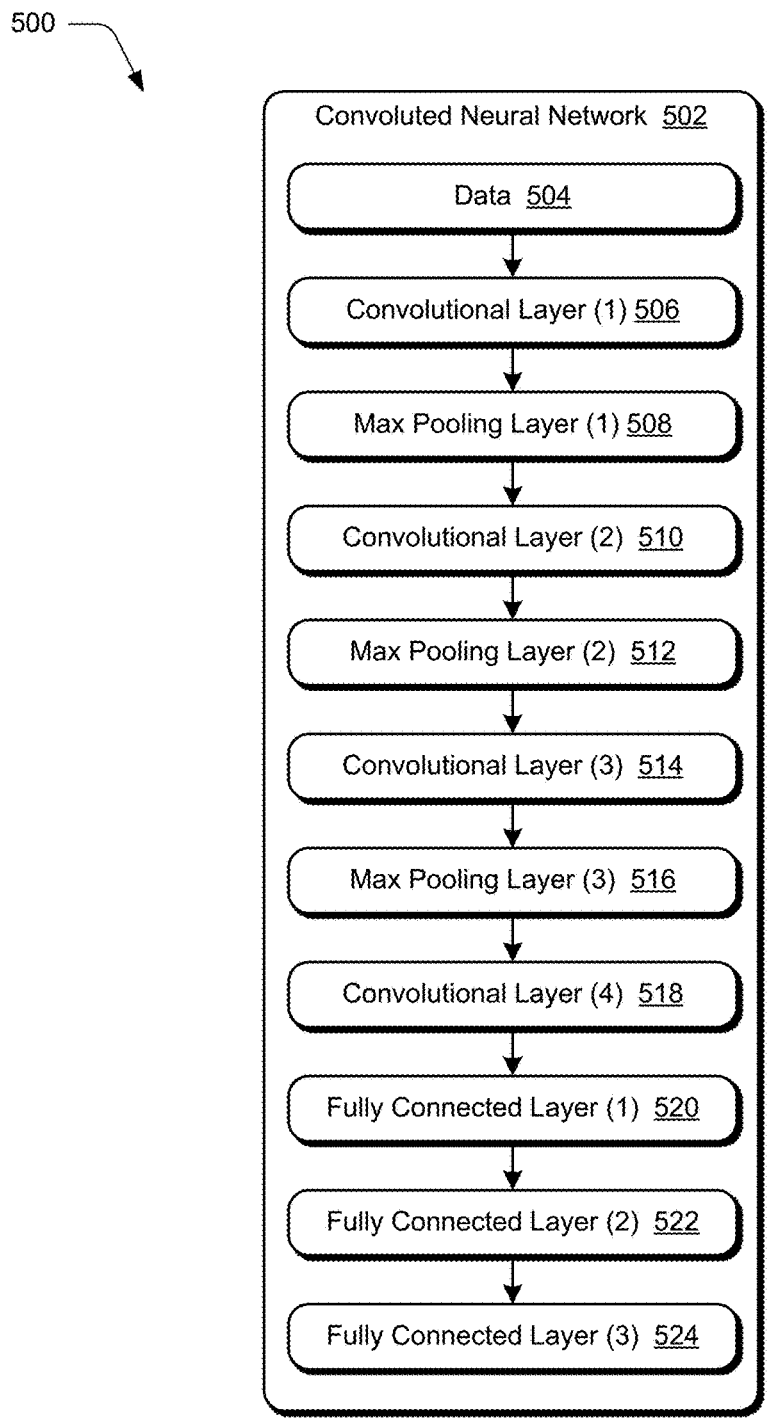
FIG. 5 is an illustration of an example implementation for a convoluted neural network that is operable to employ techniques for facial expression capture for character animation.

FIG. 5, for example, illustrates a CNN 502 that is configured for recognition of the set of six canonical facial expressions. Data 504 is facial image data, such as the input images 202, that is processed by a series of convolutional layers 506, 510, 514, and 518, and max pooling layers 508, 512, 516. The output of convolutional layer (4) 518 is processed by a series of fully connected layers 520, 522, and 524. The fully connected layer (3) 524 produces an output for each image in the data 504 that indicates which one of the six canonical facial expressions or a neutral expression has been identified in each image in the data 504.

A regularized convoluted neural network (r-CNN) combines a deep convoluted neural network for recognizing canonical facial expressions with customized techniques for feature extraction and classification for non-canonical facial expressions. The r-CNN provides real-time facial expression recognition for cutout character animation.

Figure 6:
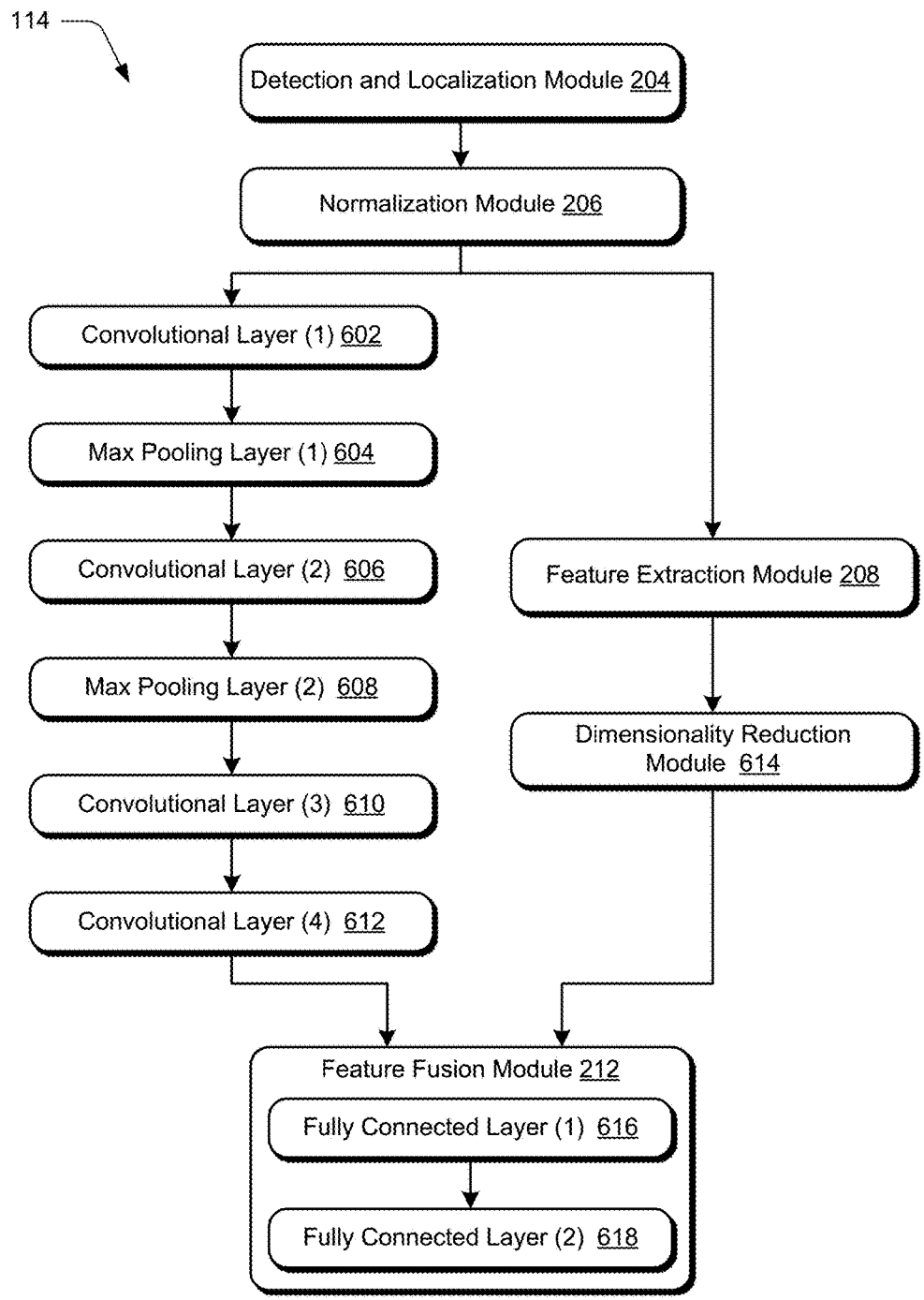
FIG. 6 is an illustration of an example implementation for a regularized convoluted neural network that is operable to employ techniques for facial expression capture for character animation.

FIG. 6 shows the regularized convoluted neural network module 114 in greater detail. The regularized convoluted neural network module 114 processes images from the input images 202 along two paths. The first path uses a convoluted neural network, which performs well on the constrained recognition task of recognizing canonical facial expressions. The second path uses customized feature extraction, which generalizes well to more categories of expressions, to recognize non-canonical facial expressions that tend to have larger inter-person variations than the canonical facial expressions. The two paths are fused with one or more fully connected layers that output identified facial expressions.

In implementations, the detection and localization module 204 identifies the facial key points 304 in images captured for facial expression capture, as described above. The images with identified the facial key points 304 are then normalized by the normalization module 206, as described above. For example, detected faces are normalized to 100 by 100 pixels. The normalized images are provided to the two paths of the regularized convoluted neural network module 114.

The first, CNN, path processes the image through a series of convolutional and max pooling layers. For example the CNN is configured to process the images through a convolutional layer (1) 602, a max pooling layer (1) 604, a convolutional layer (2) 606, a max pooling layer (2) 606, a convolutional layer (3) 610, and a convolutional layer (4) 612. Other configurations of the convolution and max pooling layers are contemplated.

The second, customized feature extraction, path processes the normalized images in the feature extraction module 208, as described above. A dimensionality reduction module 614 reduces the output of the feature extraction module 208 to a lower-dimensional space. For example, the dimensionality reduction module 614 may perform principal component analysis (PCA) to transform the output of the feature extraction module 208 from a high-dimension space to a space of fewer dimensions to remove redundancy and noise.

The outputs of the convolutional layer (4) 612 and the dimensionality reduction module 614 are combined in the feature fusion module 212. The feature fusion module 212 includes a fully connected layer (1) 616 and a fully connected layer (2) 618.

The CNN in the r-CNN module 114 is trained to recognize canonical expressions using publicly available libraries of the canonical expressions. The publicly available libraries can be enhanced to improve training of the CNN or r-CNN by generating variations of each face. For example, the canonical expression datasets are augmented by generating variations of each face via cropping, horizontal flipping, and perturbing aspect ratios to increase the number of canonical facial expression images for training.

Considering forward propagation in the CNN layers 602-612, the output of each layer is the linear combination of the inputs non-linearly mapped by an activation function:

$$u^{k+1} = f((W^{k+1})^T u^k) \quad (9)$$

where $u^{k+1}$ indicates the k-th layer output, $W^k$ indicates the weights that connect to each output node, and f(.) is the nonlinear activation function, for example a rectified linear unit (ReLU). To update the weights of each CNN layer 602-612, back propagation is applied:

$$\delta^k = (W^k)^{T\delta k+1} \frac{\partial f}{\partial u^k} \quad (10)$$

where δk is the increment of weights at layer k. For training the r-CNN module 114, weights connecting the fully connected layer (1) 616 are split into two parts: weights for the feature extraction features, $W_h^7$, and weights for the convolutional layer (4) 612, $W_c^7$.

The weights connecting the fully connected layer (1) 616 to the fully connected layer (2) 618 in the feature fusion module 212 are updated according to the customized feature inputs with $W_c^7$ initialized to zero. Upon convergence, the weights $W_h^7$ are fixed. The training of the regularized convolutional neural network module 114 results in improved overall classification accuracy of both canonical and non-canonical facial expressions.

Determined facial expressions from the input images 202 are classified. In implementations, the expression classification module 116 classifies the facial expressions determined by the regularized convoluted neural network module 114. Classifications are created for each customized expression that will be used in the cutout character animation. In implementations, the facial expression classifier module 112 classifies each of the customized expressions, based on recordings of a user demonstrating all the customized expressions that the facial expression classifier module 112 will recognize.

The expression classifier module 116 defines a Support Vector Machine-based (SVM-based) classifier for each customized expression. The expression classifier module 116 also includes an SVM-based classifier for each of the canonical expressions. The facial expression classifier module 112 classifies a current facial expression in real-time (e.g., at the frame rate of the video of the input images 202). The facial expression classifier module 112 may additionally apply motion tracking to the facial landmarks in the input images 202 to enable the character animator system 106 to apply continuous deformations to the animated character based on the motion of the tracked facial landmarks.

For example, for each of the T customized expressions that the user demonstrates, the expression classifier module 116 configures an SVM-based classifier by taking $n_i$ training frames from the demonstration of a customized expression, i, as positive samples. The expression classifier module 116 treats the recorded frames from all the other expressions as negative samples. Note that $n_i$ is typically far less than $\Sigma_{j\neq i} n_j$. The expression classifier module 116 randomly splits all the negative samples into $$N = \frac{\sum_{j \neq i} n_j}{n_i}$$

piles, each of which has approximately $n_i$ samples. The expression classifier module 116 trains N independent SVM-based classifiers. The expression classifier module 116 repeats this procedure independently t times to produce tN classifiers. The expression classifier module 116 combines the tN classifiers linearly to obtain a ensemble classifier for expression i:

$$F_N(x) \sum_{j=1}^{tN} \omega_j f_j(x) \quad (11)$$

where $f_j$ is the j-th SVM-based classifier trained using the positive samples and the j-th pile of negative samples, and $\omega_j$ is its associated weight that is initialized as $$\frac{1}{tN}.$$

During on-line testing, among the tN classifiers, some of the classifiers may produce results that conflict to the final classification output, $F_N$. The expression classifier module 116 decreases the weights of the conflicting classifiers with a small amount of decay β, $$\omega_j = (1-\beta)\omega_j \quad (12)$$

The expression classifier module 116 normalizes all the weights of the tN classifiers to a unit sum for next iterations:

$$\omega_j = \frac{1}{\sum_k \omega_k} \omega_j \quad (13)$$

The expression classifier module 116 adjusts the contributions of the ensemble of the SVM-based classifiers to achieve robustness to slight mismatches between the few recorded training samples and the same expression demonstrated in a performance.

To reduce jittering artifacts (i.e., flipping rapidly between two or more facial expressions) that may be produced by frame-by-frame classification of the SVM-based ensemble classifier, temporal information is considered to smooth the classification results. In implementations, the temporal smoothing module 118 applies temporal smoothing to the classification outputs from the expression classifier module 116 to produce the classified facial expressions 218.

For example, the temporal smoothing module 118 applies an online sequential Hidden Markov Model (HMM) to smooth the classification outputs of the expression classifier module 116. The HMM maximizes the joint probability of the current hidden state $s_t$ and all the previous observations $x_{\{1, 2, \ldots, t\}}$. The hidden state $s_t$ is the underlying expression category while the data observations are the captured facial expressions.

The joint probability is denoted as $\alpha(s_t) = p(s_t, x_{\{1, 2, \ldots, t\}})$. The temporal smoothing module 118 updates the joint probability by Bayesian inference, using a recursion function:

$$\alpha(s_t) = p(x_t \mid s_t) \sum_{s_{t-1}} p(s_t \mid s_{t-1}) \alpha(s_{t-1}) \quad (14)$$

where $p(x_t|s_t)$ is the expression recognition posterior and $p(s_t|s_{t-1})$ is the state transition probability. In a transition matrix, for each non-neutral expression, the probability of a self-transition (i.e., remaining in the same facial expression) and a transition to the neutral expression are the same. In addition, transitions from the neutral expression to every other non-neutral expression are equally likely. The probability of a self-transition from the neutral expression is independent. The temporal smoothing module 118 assumes that between one non-neutral expression and another non-neural expression, there are neutral frames. Thus, the transition matrix contains four independent variables. The temporal smoothing module 118 obtains the transition matrix through cross validation with multi-dimensional line search. For the posterior $p(x_t|s_t)$, according to Bayes' rule, $p(z_t|s_t) \propto p(s_t|z_t)$ (uniform prior on all customized expressions), where the likelihood $p(s_t|z_t)$ can be approximated by converting the outputs of the expression classifier module 118, in Equation 11 into probabilities with a softmax function.

Figure 7:
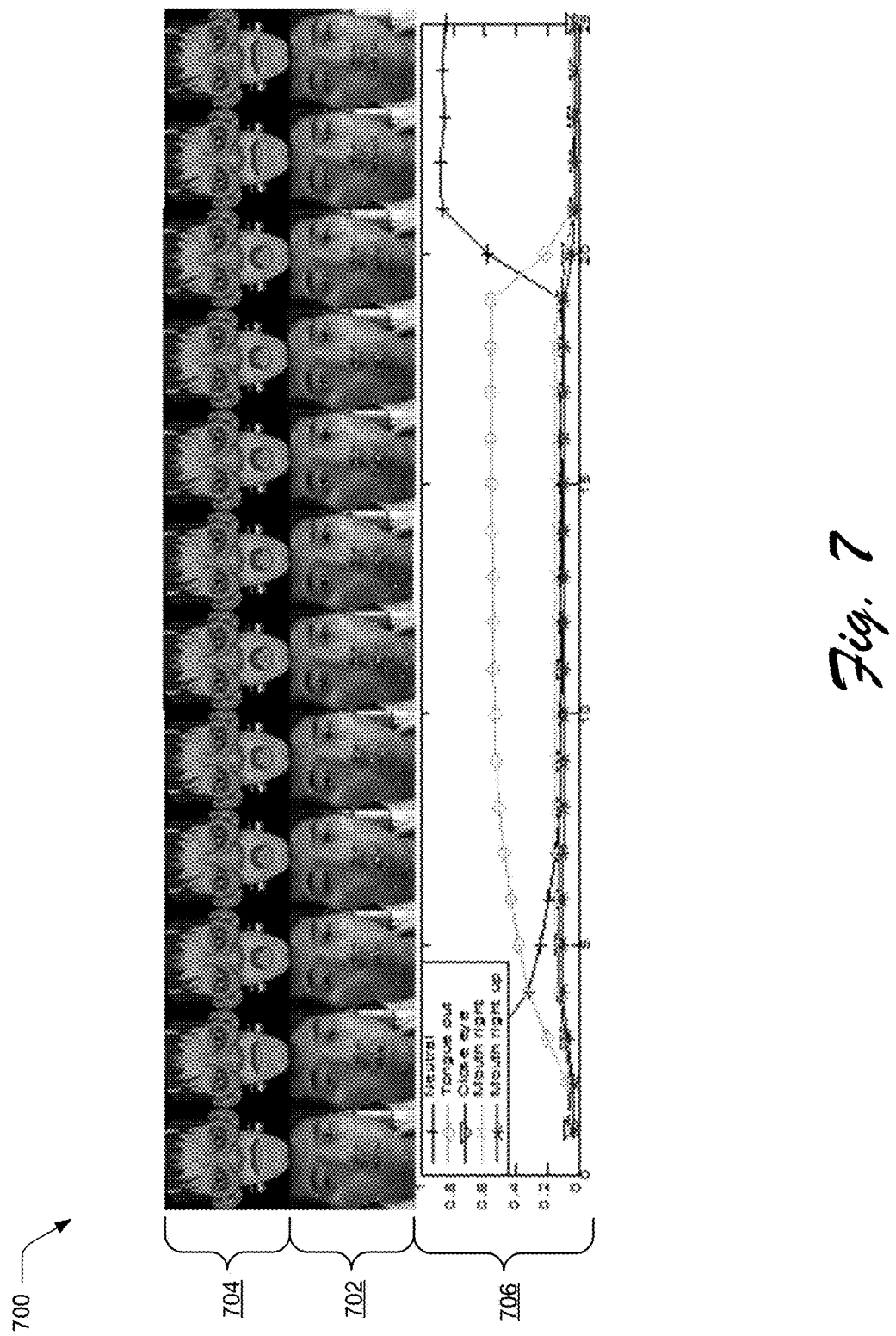
FIG. 7 is an illustration of an example of character animation employing techniques for facial expression capture for character animation.
Figure 8:
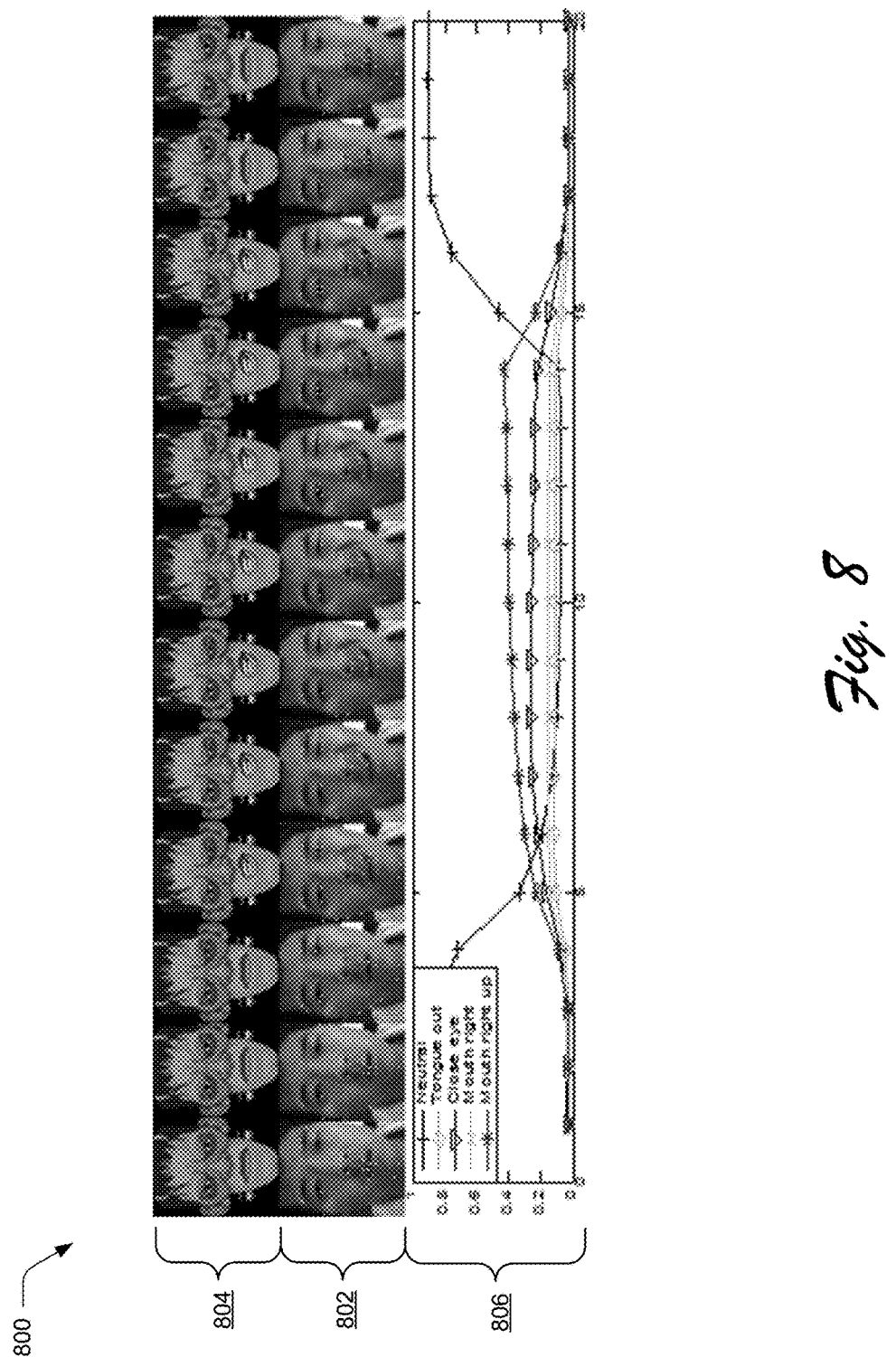
FIG. 8 is an illustration of an example of character animation employing techniques for facial expression capture for character animation.

FIGS. 7 and 8 illustrate operations of the facial expression classifier 112. In an example, FIG. 7 shows a series of input video frames, at 702, and the resulting character animation frames, at 704, produced based on the customized facial expressions recognized by the facial expression classifier module 112. At 706, is an associated graph illustrating the probabilities for the neutral expression and four customized expressions: "tongue out," "close eye," "mouth right," and "mouth right up." The graph 706 illustrates the facial expression classifier 112 recognizing a neutral expression, a transition to the "tongue out" expression, and a transition back to the neutral expression.

In another example, FIG. 8 shows a series of input video frames, at 802, and the resulting character animation frames, at 804, produced based on the customized facial expressions recognized by the facial expression classifier 112. At 806, is an associated graph illustrating the probabilities for the neutral expression and the four customized expressions. The graph 806 illustrates the facial expression classifier 112 recognizing a neutral expression, a transition to the "mouth right up" expression, and a transition back to the neutral expression.

The accuracy of facial recognition of the facial expression classifier module 112 produces favorable results, using publicly available data sets of canonical facial expression images, such as the CK+ and MMI data sets, when compared to other known techniques, such as Interval Temporal Bayesian Networks (ITBN), Common and Specific Patches (CSPL), and Longitudinal Facial Expression Atlases (LFEA).

The tables below compare the average accuracy of facial expression capture for character animation with ITBN, CSPL, and LFEA for the CK+ and MMI datasets of canonical facial expressions, respectively. In the tables, the methods labeled "Geo," "App," and "HC" correspond to the results using the geometric feature extraction module 214, the appearance feature extraction module 216, and the customized or handcrafted feature extraction of the feature extraction module 208 that combines geometric and appearance feature extraction. The methods labeled "CNN" and "r-CNN" correspond to results produced by the convoluted neural network 502 and the regularized convoluted neural network module 114.

| Method | CK+ | | | | | | |
|---|---|---|---|---|---|---|---|
| | Angry | Disgust | Fear | Happy | Sad | Surprise | Ave. |
| Geo | 0.84 | 0.76 | 0.58 | 0.88 | 0.66 | 0.75 | 0.81 |
| App | 0.87 | 0.96 | 0.97 | 0.87 | 0.93 | 0.87 | 0.91 |
| HC | 0.96 | 0.97 | 0.95 | 0.96 | 0.99 | 0.90 | 0.96 |
| ITBN | 0.91 | 0.94 | 0.83 | 0.89 | 0.76 | 0.91 | 0.87 |
| CSPL | 0.71 | 0.95 | 0.81 | 0.95 | 0.88 | 0.98 | 0.88 |
| LFEA | 0.95 | 0.98 | 0.95 | 0.99 | 0.97 | 0.99 | 0.97 |
| CNN | 1.00 | 0.99 | 0.99 | 1.00 | 1.00 | 1.00 | 0.99 |
| r-CNN | 1.00 | 0.99 | 1.00 | 1.00 | 1.00 | 1.00 | 1.00 |

| Method | MMI | | | | | | |
|---|---|---|---|---|---|---|---|
| | Angry | Disgust | Fear | Happy | Sad | Surprise | Ave. |
| Geo | 0.35 | 0.75 | 0.45 | 0.92 | 0.85 | 0.94 | 0.71 |
| App | 0.62 | 0.80 | 0.48 | 0.95 | 0.84 | 0.97 | 0.78 |
| HC | 0.62 | 0.97 | 0.67 | 1.00 | 0.96 | 1.00 | 0.87 |
| ITBN | 0.47 | 0.55 | 0.57 | 0.71 | 0.66 | 0.63 | 0.60 |
| CSPL | 0.50 | 0.79 | 0.67 | 0.83 | 0.60 | 0.89 | 0.71 |
| LFEA | 0.92 | 0.95 | 0.94 | 0.97 | 0.92 | 0.94 | 0.94 |
| CNN | 1.00 | 1.00 | 1.00 | 0.99 | 0.99 | 0.99 | 0.99 |
| r-CNN | 1.00 | 1.00 | 0.99 | 1.00 | 0.99 | 0.98 | 0.99 |

The accuracy for recognition of customized (non-canonical) facial expressions is evaluated based on 5 to 10 acted expressions (in the input images 202). Each customized facial expression is trained using as a short video (1 to 2 seconds) as the input images 202 for training. The facial expression classifier module 112 is evaluated using a two-minute test video that includes three to five performances of each customized facial expression that was trained.

The results of the recognition of customized facial recognition are summarized in the table below in terms of the statistical measures: precision, recall, F1 score, and correction ratio (C-Ratio). The correction ratio is defined as the number of incorrect detected expression intervals over the number of groundtruth intervals that fail to yield a higher-than-threshold overlap with a groundtruth expression interval. Each metric in the table is shown with a mean and a standard deviation across the test dataset.

In the table, the features labeled "Geo," "App," and "HC" correspond to the results using the geometric feature extraction module 214, the appearance feature extraction module 216, and the customized or handcrafted feature extraction of the feature extraction module 208 that combines geometric and appearance feature extraction. The features labeled "CNN-f7" and "CNN-c6" correspond to results output at the convolutional layer (4) 612 and the fully connected layer (1) 616. The features labeled "HC+CNN-f7" and "HC+CNN-c6" correspond to results output at the convolutional layer (4) 612 and the fully connected layer (1) 616 combined with the produced by the feature extraction module 208. The feature labeled "r-CNN" corresponds to the fused feature output of the regularized convoluted neural network module 114.

| Feature | Precision | Recall | F1 Score | C-Ratio |
|---|---|---|---|---|
| Geo | 0.66 ± 0.14 | 0.63 ± 0.13 | 0.65 | 0.19 ± 0.16 |
| App | 0.85 ± 0.08 | 0.85 ± 0.11 | 0.85 | 0.13 ± 0.10 |
| HC | 0.86 ± 0.08 | 0.89 ± 0.10 | 0.87 | 0.12 ± 0.10 |
| CNN-f7 | 0.79 ± 0.11 | 0.78 ± 0.13 | 0.79 | 0.25 ± 0.20 |
| CNN-c6 | 0.82 ± 0.08 | 0.79 ± 0.17 | 0.80 | 0.15 ± 0.15 |

-continued

| Feature | Precision | Recall | F1 Score | C-Ratio |
|---|---|---|---|---|
| HC + CNN-f7 | 0.87 ± 0.06 | 0.84 ± 0.13 | 0.85 | 0.14 ± 0.14 |
| HC + CNN-c6 | 0.89 ± 0.05 | 0.85 ± 0.11 | 0.87 | 0.12 ± 0.11 |
| r-CNN | 0.90 ± 0.06 | 0.89 ± 0.09 | 0.89 | 0.10 ± 0.09 |

Example Procedures

The following discussion describes techniques for facial expression capture for character animation that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and example implementations 200 and 600 of FIGS. 2 and 6, respectively.

Figure 9:
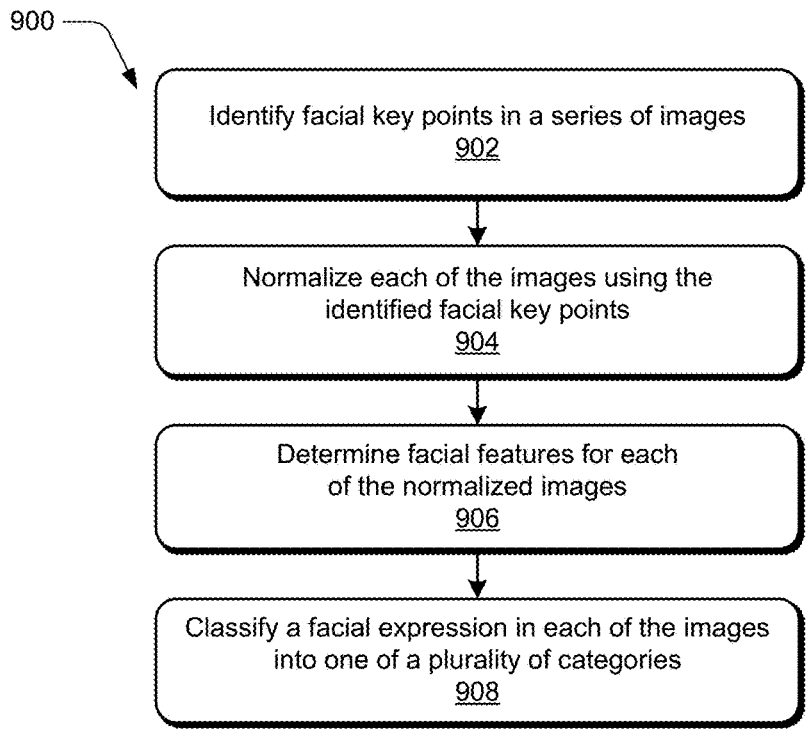
FIG. 9 is a flow diagram depicting a procedure in an example implementation in which techniques for facial expression capture for character animation are employed.

FIG. 9 is a flow diagram depicting a procedure in an example implementation in which techniques for facial expression capture for character animation are employed. Facial key points are identified in a series of images (block 902). For example, the detection and localization module 204 detects facial key points in each image of the input images 202 and determines a location for each of the facial key points in each image.

Images are normalized based on the identified facial key points (block 904). For example, the normalization module 206 normalizes each image in the input images 202 to a consistent scale based on a measurement of facial features, such as inter-ocular distance.

Facial features are determined for each of the normalized images (block 906). For example, the facial feature extraction module 208 determines facial features using any suitable feature extraction technique or combination of techniques, such as geometric feature extraction, appearance feature extraction, deep convoluted neural networks, and the like.

Facial expressions are classified into one of a plurality of categories based on the determined facial features in each of the normalized images (block 908). For example, the expression classification module 116 compares classification scores of facial expressions for each of the categories (canonical and/or non-canonical facial expression categories) to determine if a classification score exceeds a threshold, and if a classification exceeds a threshold the facial expression is classified as being in that category of facial expression. Otherwise, the facial expression is classified as a neutral expression.

Figure 10:
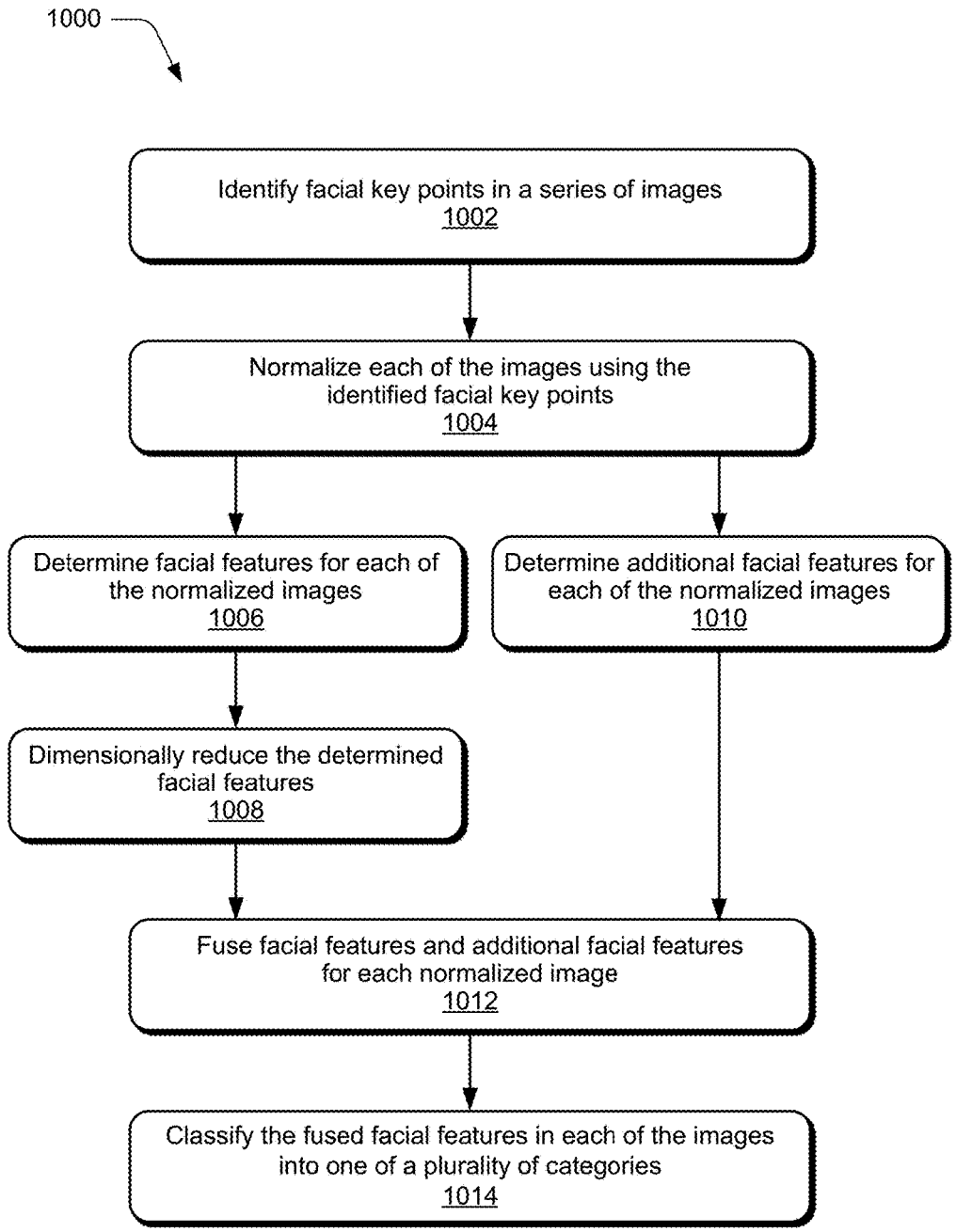
FIG. 10 is a flow diagram depicting a procedure in an example implementation in which techniques for facial expression capture for character animation are employed.

FIG. 10 is a flow diagram depicting a procedure in an example implementation in which techniques for facial expression capture for character animation are employed. Facial key points are identified in a series of images (block 1002). For example, the detection and localization module 204 detects facial key points in each image of the input images 202 and determines a location for each of the facial key points in each image.

Images are normalized based on the identified facial key points (block 1004). For example, the normalization module 206 normalizes each image in the input images 202 to a consistent scale based on a measurement of facial features, such as inter-ocular distance.

Facial features are determined for each of the normalized images (block 1006). For example, the facial feature extraction module 208 determines facial features using one or more suitable feature extraction techniques, such as geometric feature extraction and/or appearance feature extraction.

Determined facial features are dimensionally reduced to a lower dimension space (block 1008). For example, the dimensionality reduction module 116 performs PCA to transform the output of the feature extraction module 208 from a high-dimension space to a space of fewer dimensions to remove redundancy and noise.

Additional facial features are determined for each of the normalized images (block 1010). For example, the deep convoluted neural network 210 extracts additional facial expressions, including canonical facial expressions, from the normalized images.

Determined facial features and determined additional facial features are fused for each normalized image (block 1012). For example, the feature fusion module 116 uses one or more fully connected CNN layers to concatenate the facial features determined by the feature extraction module 206 and the additional facial features determined by the deep convoluted neural network module 210 into a fused facial feature.

Facial expressions are classified into one of a plurality of categories based on the fused facial features in each of the normalized images (block 1014). For example, the expression classification module 116 compares classification scores of facial expressions for each of the categories (canonical and/or non-canonical facial expression categories) to determine if a classification score exceeds a threshold, and if a classification exceeds a threshold the facial expression is classified as being in that category of facial expression. Otherwise, the facial expression is classified as a neutral expression.

Figure 11:
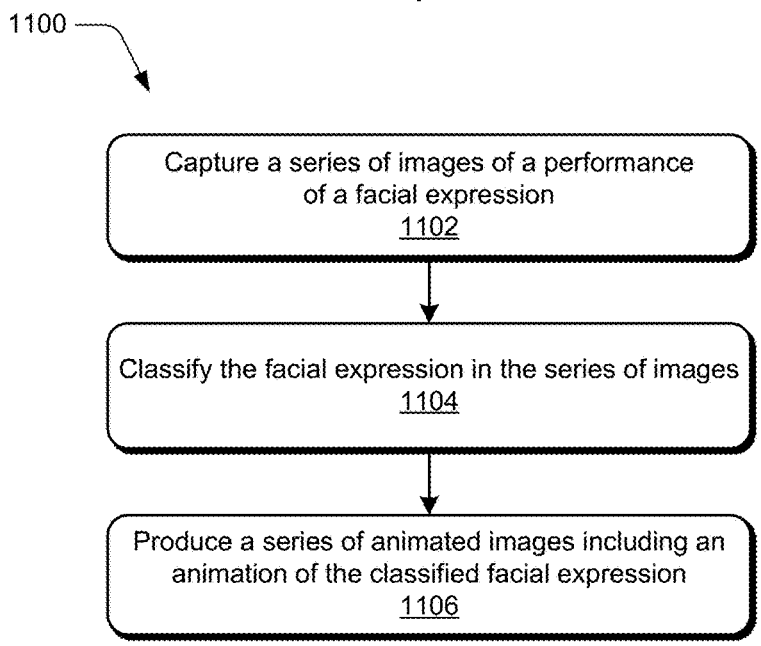
FIG. 11 is a flow diagram depicting a procedure in an example implementation in which techniques for facial expression capture for character animation are employed.

FIG. 11 is a flow diagram depicting a procedure in an example implementation in which techniques for facial expression capture for character animation are employed. A series of images are captured that include the performance of a facial expression (block 1102). For example, the image capture device 102 captures a series of frames of a video that includes the performance of a facial expression.

Facial expressions in the series of images are classified into one of a plurality of categories based on the determined facial features in each image in the series of images (block 1104). For example, the facial expression classifier module 112 classifies the performed facial expression into one of a plurality of classifications for each frame of the video.

A series of animated images including an animation of the classified facial expression are produced (block 1106). For example, the character animator system 106 receives an indication of the facial expression classification for a frame of the captured video and uses the indication to produce a frame of animation including an animation of the classified facial expression using any suitable technique, such as cutout animation.

Example System and Device

Figure 12:
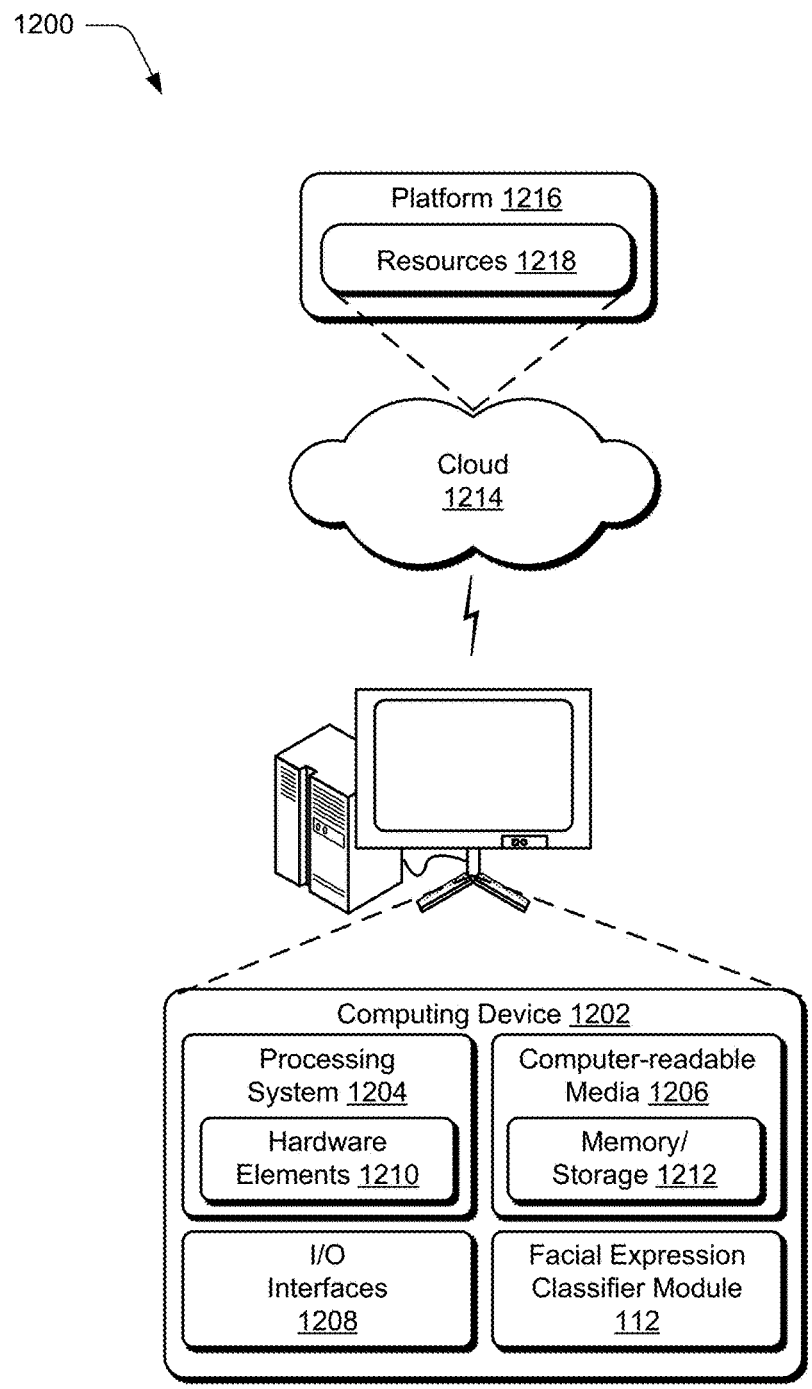
FIG. 12 illustrates various components of an example device that can be implemented as any type of computing device as described herein to implement the techniques described herein.

FIG. 12 illustrates an example system generally at 1200 that includes an example computing device 1202 that is representative of one or more computing systems and/or devices that may implement the various techniques described herein. This is illustrated through inclusion of facial expression classifier module 112, which may be configured to classify facial expression for character animation. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

The input/output interface(s) 1208 are representative of functionality to allow a user to enter commands and information to the computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1210 and the computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or the hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of the platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. The resources 1218 can also include services 1220 provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout system 1200. For example, the functionality may be implemented in part on the computing device 1202 as well as via the platform 1216 that abstracts the functionality of the cloud 1214.

Conclusion

Although embodiments of facial expression capture for character animation have been described in language specific to structural features and/or methods, the appended claims are not necessarily limited to the specific features or methods described. Rather, the specific features and methods are disclosed as example forms of implementing facial expression capture for character animation, and other equivalent features and methods are intended to be within the scope of the appended claims. Further, various different embodiments are described and it is to be appreciated that each described embodiment can be implemented independently or in connection with one or more other described embodiments.

What is claimed is:

1. A computer-implemented method for character animation based on classifying facial expressions of a user from a series of images, the method comprising:
    identifying facial key points in each image of the series of images;
    normalizing each image of the series of images using the identified facial key points for each of the images;
    determining facial features from each normalized image;
    inputting the normalized images to a deep convolutional neural network (CNN) that determines additional facial features in the normalized images;
    fusing dimensionally reduced facial features with the determined additional facial features before the classifying of the facial expressions in each image of the series of images;
    based on the fusing of the dimensionally reduced facial features, said classifying the facial expressions in each image of the series of images into one of a plurality of categories; and
    producing a series of animated images of an animated character, the animated images of the animated character including one or more animated facial expressions, each animated facial expression being associated with a corresponding classified facial expression.

2. The method of claim 1, wherein a change in the classification of the facial expressions from a first classification to a second classification changes artwork for the character animation based on the change in the classification.

3. The method of claim 1, wherein the determining the facial features comprises:
    extracting geometric features from each image of the series of images, the geometric features describing spatial deformations of the facial key points; and
    extracting appearance features from each image of the series of images, the appearance features describing appearance changes due to the spatial deformation of the facial key points.

4. The method of claim 3, wherein the geometric features comprise a plurality of measurements based on shapes and locations of the facial features.

5. The method of claim 3, wherein the extracting the appearance features comprises:
    partitioning each image of the series of images into a uniform grid of patches;
    combining adjacent partitioned patches into a plurality of regions in each image;
    determining Histogram of Gradient (HoG) features for each of the regions; and
    concatenating the determined HoG features into an integrated vector.

6. The method of claim 1, wherein the determined additional facial features are associated with a plurality of canonical facial expressions, and wherein the determined facial features from each normalized image are associated with customized facial expressions.

7. The method of claim 1, further comprising:
    temporally smoothing the classified facial expressions to reduce jitter between the animated facial expressions in the produced character animation.

8. The method of claim 1, further comprising:
    capturing the series of images for facial expression classification with an image capture device.

9. A device that implements classification of facial expressions of a user from a plurality of images, the device comprising:
    memory configured to store the plurality of images;
    a processing system to implement a facial expression classifier module as executable instructions configured to:
    identify facial key points in the plurality of images;
    normalize each of the images using the identified facial key points for each of the images;

determine facial features from each of the normalized images;
dimensionally reduce the determined facial features;
input the normalized images to a deep convolutional neural network (CNN) that determines additional facial features in the normalized images;
fuse dimensionally reduced facial features with the determined additional facial features before the classification of the facial expressions in each of the images; and
based on the fusion of the dimensionally reduced facial features, classify a facial expression in each of the images into one of a plurality of categories.

10. The device of claim 9, wherein the facial expression classifier module is configured to:
temporally smooth the classified facial expressions to reduce jitter between the categories of the classified facial expressions associated with the plurality of images.

11. The device of claim 9, wherein the facial expression classifier module is configured to:
extract geometric features from each of the images, the geometric features describing spatial deformations of the facial key points; and
extract appearance features from each of the images, the appearance features describing appearance changes due to the spatial deformations of the facial key points.

12. The device of claim 11, wherein the geometric features comprise a plurality of measurements based on shapes and locations of the facial features.

13. The device of claim 11, wherein the extraction of the appearance features configures the facial expression classifier module to:
partition each image into a uniform grid of patches;
combine adjacent partitioned patches into a plurality of regions in each image;
determine Histogram of Gradient (HoG) features for each of the regions; and
concatenate the determined HoG features into an integrated vector.

14. The device of claim 9, wherein the additional facial features are associated with a plurality of canonical facial expressions, and wherein the facial features determined from each of the normalized images are associated with customized facial expressions.

15. A device that implements character animation, the device comprising:
memory configured to store a series of images;
a processing system to implement a character animation module as executable instructions configured to produce a character animation based on a classification of facial expressions of a user from the series of images, the character animation module is configured to:
identify facial key points in each image of the series of images;
normalize each image of the series of images using the identified facial key points for each of the images;
determine facial features from each normalized image;
input the normalized images to a deep convolutional neural network (CNN) that determines additional facial features in the normalized images;
fuse dimensionally reduced facial features with the determined additional facial features before the classification of the facial expressions in each of the images;
based on the fusion of the dimensionally reduced facial features, classify the facial expressions in each image of the series of images into one of a plurality of categories; and
produce a series of animated images of an animated character, the animated images of the animated character including one or more animated facial expressions, each animated facial expression being associated with a corresponding classified facial expression.

16. The device of claim 15, wherein a change in the classification of the facial expressions from a first classification to a second classification configures the character animation module to change artwork for the character animation based on the change in the classification.

17. The device of claim 15, wherein to determine the facial features, the character animation module is configured to:
extract geometric features from each image of the series of images, the geometric features describing spatial deformations of the facial key points, the geometric features comprising a plurality of measurements based on shapes and locations of the facial features; and
extract appearance features from each image of the series of images, the appearance features describing appearance changes due to the spatial deformation of the facial key points, the character animation module further configured to:
partition each image of the series of images into a uniform grid of patches;
combine adjacent partitioned patches into a plurality of regions in each image;
determine Histogram of Gradient (HoG) features for each of the regions; and
concatenate the determined HoG features into an integrated vector.

18. The device of claim 15, wherein the determined additional facial features are associated with a plurality of canonical facial expressions, and wherein the determined facial features from each normalized image are associated with customized facial expressions.

19. The device of claim 15, the character animation module being further configured to:
temporally smooth the classified facial expressions to reduce jitter between the animated facial expressions in the series of animated images.

20. The device of claim 15, further comprising:
an image capture device for capturing the series of images stored in the memory.

* * * * *